(12) United States Patent
Konishi et al.

(10) Patent No.: US 7,928,836 B2
(45) Date of Patent: Apr. 19, 2011

(54) MOBILE UNIT COMMUNICATION APPARATUS AND COMPUTER-READABLE RECORDING MEDIUM

(75) Inventors: Yoshichika Konishi, Kariya (JP); Eiji Niwa, Kariya (JP); Yasumasa Yamanoto, Kariya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 316 days.

(21) Appl. No.: 12/092,137

(22) PCT Filed: Oct. 27, 2006

(86) PCT No.: PCT/JP2006/321535
§ 371 (c)(1),
(2), (4) Date: Apr. 30, 2008

(87) PCT Pub. No.: WO2007/052562
PCT Pub. Date: May 10, 2007

(65) Prior Publication Data
US 2009/0267750 A1 Oct. 29, 2009

(30) Foreign Application Priority Data
Oct. 31, 2005 (JP) .................. 2005-316311

(51) Int. Cl.
*B60Q 1/00* (2006.01)
(52) U.S. Cl. .................................... 340/435
(58) Field of Classification Search .................. 340/435
See application file for complete search history.

(56) References Cited

U.S. PATENT DOCUMENTS

| 6,252,520 B1* | 6/2001 | Asami et al. ................... 340/903 |
| 6,693,518 B2* | 2/2004 | Kumata et al. ................. 340/435 |
| 6,707,378 B2* | 3/2004 | MacNeille et al. ............ 340/435 |
| 7,133,768 B2* | 11/2006 | Mukaiyama .................... 701/200 |
| 7,274,988 B2* | 9/2007 | Mukaiyama .................... 701/301 |
| 7,408,479 B2* | 8/2008 | Johnson ......................... 340/917 |
| 7,523,000 B2* | 4/2009 | Tengler et al. ................. 701/301 |
| 2003/0006889 A1* | 1/2003 | Koike ............................ 340/435 |

(Continued)

FOREIGN PATENT DOCUMENTS

JP 05-235845 A 9/1993

(Continued)

OTHER PUBLICATIONS

Office Action for Japanese Patent Application No. 2005-316311 dated Jan. 11, 2011.

*Primary Examiner* — George A Bugg
*Assistant Examiner* — Naomi Small
(74) *Attorney, Agent, or Firm* — Sughrue Mion, PLLC

(57) ABSTRACT

A mobile unit communication apparatus, including a wireless transceiver, is provided at a mobile unit. At the mobile unit communication apparatus, a surrounding object detection unit detects objects surrounding the mobile unit. The surrounding communication impediment detection unit detects a likelihood of an impediment to communication in the surroundings of the mobile unit from conditions for surrounding objects detected by the surrounding object detection unit. A relay communication unit transmits information received by the wireless transceiver from the wireless transceiver. A relay wait time setting unit sets a time until information received by the wireless transceiver is transmitted by the relay communication unit from the wireless transceiver longer for a larger likelihood of an impediment to communication detected by the surrounding communication impediment detection unit.

7 Claims, 14 Drawing Sheets

U.S. PATENT DOCUMENTS

2004/0061600 A1 * 4/2004 Wehner et al. ............... 340/435

FOREIGN PATENT DOCUMENTS

| | | | |
|---|---|---|---|
| JP | 2001-119331 A | 4/2001 | |
| JP | 2001-283381 A | 10/2001 | |
| JP | 2001-358641 A | 12/2001 | |
| JP | 2004-199348 A | 7/2004 | |
| JP | 2004-294068 A | 10/2004 | |
| JP | 2005-051619 A | 2/2005 | |
| JP | 2005-227978 A | 8/2005 | |

* cited by examiner

MOBILE UNIT COMMUNICATION APPARATUS AND COMPUTER-READABLE RECORDING MEDIUM

CROSS REFERENCE TO RELATED APPLICATIONS

This application is a National Stage of International Application No. PCT/JP2006/321535 filed on Oct. 27, 2006, claiming priority based on Japanese Patent Application No. 2005-316311, filed Oct. 31, 2005, the contents of all of which are incorporated herein by reference in their entirety.

TECHNICAL FIELD

The present invention relates to a communication apparatus for communicating information relating to movement between mobile units such as vehicles.

BACKGROUND ART

Peer to Peer (also known as P2P) exists as a configuration for utilizing networks communicating by direct exchange of information between an indeterminately large number of terminals. In recent years, the application of peer to peer technology to traffic systems has been considered. For example, if inter-vehicle communication, which is wireless communication between vehicles, is carried out, it is possible to transmit information such as the situation for one vehicle, the situation on the road the vehicle is traveling on, and the degree of traffic congestion surrounding the vehicle, to another vehicle in real time. Moreover, by communicating GPS information between vehicles, it is possible to make a driver of another vehicle aware of accurate information for the position and time of one vehicle. If a network is constructed using inter-vehicle communication at a place where there is congestion, there is no need to install expensive equipment for collecting congestion information at the road itself.

Wireless P2P is expected to take on the role of preventing accidents before they happen. If vehicles are approaching an intersection with no visibility, it is possible to alert drivers by sending information to the effect that "a vehicle is approaching the intersection" between the vehicles.

Two types of P2P technology exist, P2P technology requiring the mediation of a central server, and P2P technology where data is passed using a bucket brigade method (a multi-hop wireless network). Inter-vehicle communication is the latter multi-hop wireless network method. In the multi-hop wireless network method, even if communication is blocked at one location, the network as a whole does not stop. The multi-hop wireless network method does have the drawback, however, that network congestion is accelerated as the number of users increases.

Devices for transmitting and receiving signals between mobile units such as vehicles, such as, for example, disclosed in patent document 1 in the following, are well-known.

If the apparatus disclosed in patent document 1 is used, when one vehicle detects traffic conditions or anomalous events, this vehicle can send the detected information to all of the vehicles within wireless transmission range.

However, high-frequency signals are typically utilized in wireless communication used in inter-vehicle communication systems. It is therefore not possible for vehicles detecting information to communicate with other vehicles concealed by impediments to communication when impediments to communication such as, for example, buildings etc. that block signals are present.

On the other hand, multi-hop wireless network technology where communication between mobile units that cannot communicate with each other directly is made possible by a plurality of mobile units relaying signals is also well-known as mobile unit communication technology. A routing protocol for constructing a path for various multi-hop wireless networks has also been developed. Namely, communication is made possible even when signals cannot be transmitted directly between mobile units by relaying signals to other mobile units.

However, multi-hop wireless networks for mobile units have the drawback of slow convergence of path caused by disordered hopping so that communication efficiency is poor.

Methods for improving efficiency of communication between specific vehicles on multi-hop wireless communication networks are proposed in patent document 2 and patent document 3. However, these methods do not improve efficiency of communication of multi-hop wireless networks between indeterminate mobile units.

In patent document 4, technology is disclosed capable of improving the efficiency of communication between mobile units that cannot communicate directly as a result of impediments to communication that block signals. In the technology disclosed in patent document 4, it is determined whether or not the state of communication for mobile units is good or poor based on detection results of an image processing apparatus that detects whether or not impediments to communication exist in the surroundings of the mobile unit. Hopping of information received by wireless transceivers is then controlled based on the results of this determination.

Patent Document 1: Unexamined Japanese Patent Application KOKAI Publication No. 2001-283381
Patent Document 2: Unexamined Japanese Patent Application KOKAI Publication No. 2001-119331
Patent Document 3: Unexamined Japanese Patent Application KOKAI Publication No. 2001-358641
Patent Document 4: Unexamined Japanese Patent Application KOKAI Publication No. 2005-51619

DISCLOSURE OF INVENTION

Problems to be Solved by the Invention

The technology disclosed in patent document 4 controls priority of the hopping as high priority and low priority. Specifically, the burden of priority for hopping of information is placed more on vehicles where the communication conditions are good than where the communication conditions are poor. As a result, according to the technology disclosed in patent document 4, more efficient communication can be achieved than for the case where hopping takes place at the communication apparatus of each vehicle in a disordered manner. However, the technology disclosed in patent document 4 is not sufficient for transmitting information, etc. with a high degree of urgency rapidly.

In order to solve the situation described above, it is the object of the present invention to provide a mobile unit communication apparatus and program capable of making rapid and efficient communication between mobile units that cannot communicate directly due to impediments to communication that block signals.

Means for Resolving the Problems

In order to achieve the above object, a mobile unit communication apparatus of a first aspect of the present invention is a mobile unit communication apparatus, including a wireless transceiver, provided at a mobile unit, comprising:

a surrounding object detection unit that detects objects surrounding the mobile unit;

a surrounding communication impediment detection unit that detects a likelihood of an impediment to communication in the surroundings of the mobile unit from conditions for surrounding objects detected by the surrounding object detection unit;

a relay communication unit that transmits information received by the wireless transceiver from the wireless transceiver; and a relay wait time setting unit that sets the time until information received by the wireless transceiver is transmitted from the wireless transceiver longer at the relay communication unit for a larger likelihood of an impediment to communication detected by the surrounding communication impediment detection unit.

Further, at the mobile unit communication apparatus, the surrounding object detection unit may also comprise a photographing unit that takes an image of surroundings of the mobile unit, and the surrounding communication impediment detection unit may also detect a likelihood of an impediment to communication based on an image taken by the photographing unit.

Further, at the mobile unit communication apparatus, the surrounding object detection unit may comprise a photographing unit that takes an image of surroundings of the mobile unit, and may detect objects surrounding the mobile unit by dividing the image taken by the photographing unit into a plurality of regions according to brightness.

Further, at the mobile unit communication apparatus, the surrounding communication impediment detection unit may detect a likelihood of an impediment to communication in the surroundings of the mobile unit using a number of regions that the image taken by the photographing unit are divided into by the surrounding object detection unit.

Further, at the mobile unit communication apparatus, the image taken by the photographing unit may comprise an arbitrary combination of images for to the front, to the rear, to the right, to the left, to the front side, to the rear side, or images for the entire surroundings of the mobile unit.

Further, at the mobile unit communication apparatus, the relay communication unit may not transmit information from the wireless transceiver when the same information as the information received by the wireless transceiver is received again during a time, which is set by the relay wait time setting unit, until the information received by the wireless transceiver is transmitted from the wireless transceiver.

Further, a computer-readable recording medium of a second aspect of the present invention stores a program for allowing a computer, which is connected to a wireless transceiver provided at a mobile unit and a surrounding object detection apparatus that detects objects surrounding the mobile unit, to execute:

a surrounding object detection step of detecting objects surrounding the mobile unit at the surrounding object detection apparatus;

a surrounding communication impediment detection step of detecting a likelihood of an impediment to communication in the surroundings of the mobile unit from conditions for surrounding objects detected by the surrounding object detection step;

a relay communication step of transmitting information received by the wireless transceiver from the wireless transceiver; and a relay wait time setting step of setting a time until information received by the wireless transceiver is transmitted from the wireless transceiver longer in the relay communication step for a larger likelihood of an impediment to communication detected by the surrounding communication impediment detection step.

EFFECT OF THE INVENTION

In the present invention, the time until relaying is set to be longer for mobile units where the likelihood of an impediment to communication being in the surroundings is larger. As a result, according to the present invention, more efficient communication is possible compared to the case where hopping takes place at the mobile unit communication apparatus in a disordered manner. Further, according to the present invention, more rapid and effective communication is possible between mobile units that cannot communicate directly due to impediments to communication that block signals.

Figure 1:
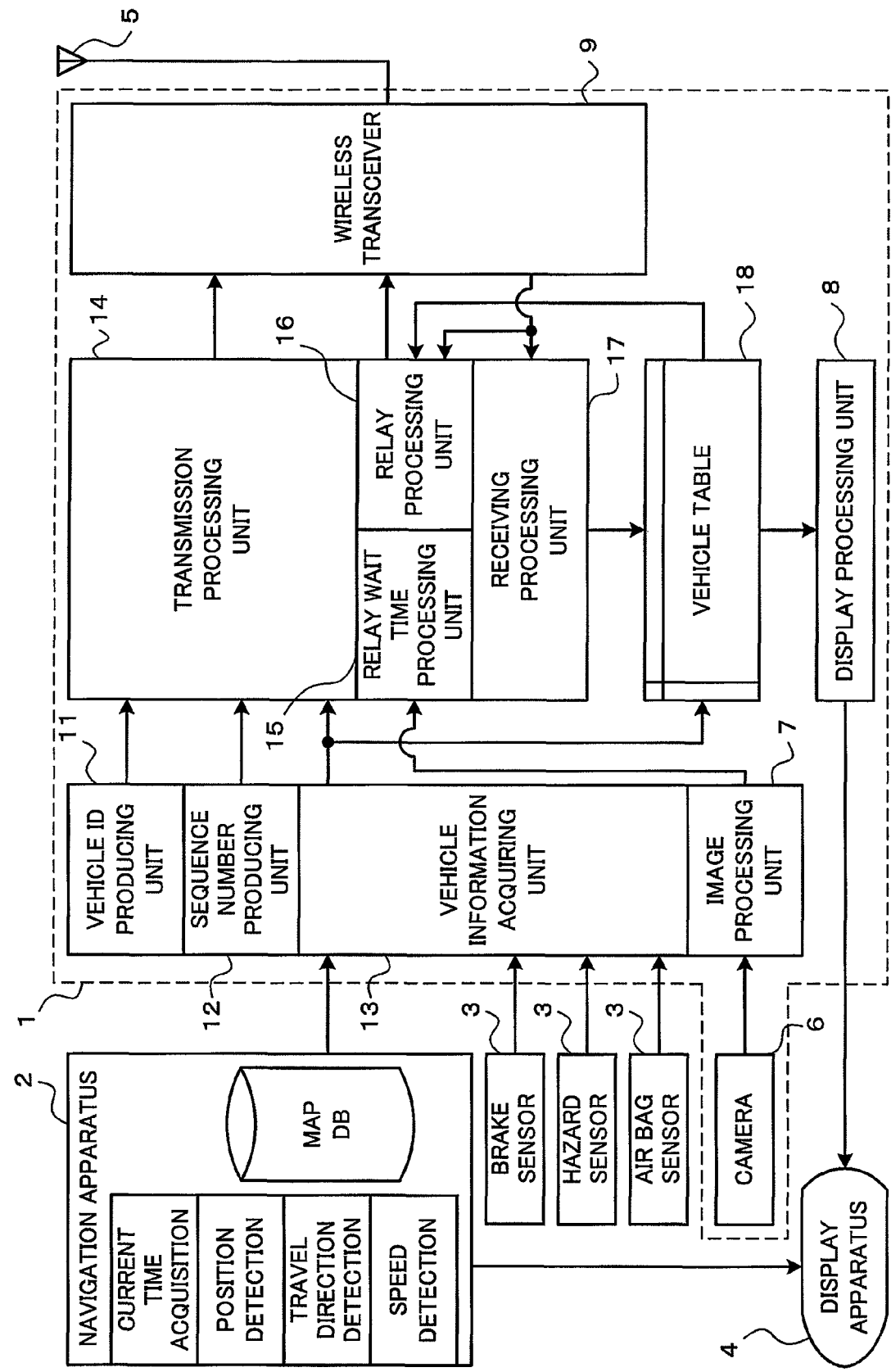
FIG. 1 is a block diagram showing a structure for a mobile unit communication apparatus of the embodiment of the present invention.

DESCRIPTION OF THE NUMERALS 1 mobile unit communication apparatus
6 camera (surrounding object detection unit)
7 image processing unit (surrounding communication impediment detection unit)
9 wireless transceiver
15 relay wait time processing unit (relay wait time setting unit)
16 relay processing unit (relay communication unit)
20 internal bus
21 control unit
22 main storage unit
23 external storage unit
24 input unit
25 display unit

BEST MODE FOR CARRYING OUT THE INVENTION

A mobile unit communication apparatus of an embodiment of the present invention is described with reference to the drawings. FIG. 1 is a block diagram showing a structure for a mobile unit communication apparatus 1 of the embodiment of the present invention. In the embodiment, the mobile unit communication apparatus 1 is mounted on a vehicle 50 shown in FIGS. 3A to 3G The mobile unit the mobile unit communication apparatus 1 is mounted on is by no means limited to the vehicle 50.

In FIG. 1, the portion encompassed by a dashed line is the mobile unit communication apparatus 1. A navigation apparatus 2 that detects the position and direction of travel, etc. of the vehicle 50 is connected to the mobile unit communication apparatus 1. The navigation apparatus 2 is equipped with a GPS (Global Positioning System), a map database, and a vehicle speed sensor, etc. The navigation apparatus 2 is capable of acquiring the current time, and is also capable of detecting the position, direction of travel, and speed of the vehicle 50.

A sensor 3 that detects various information for the vehicle 50 is connected to the mobile unit communication apparatus 1. The sensor 3 can be, for example, a brake sensor that detect the operation of the brakes of the vehicle 50, a hazard sensor that detects the operation of a hazard lamp that gives notification of emergency situations for the vehicle 50, or an air bag sensor that detects the operation of an air bag that operates when the vehicle 50 experiences an impact of a fixed value or more.

A display apparatus 4 is connected to the mobile unit communication apparatus 1. The display apparatus 4 is constituted by a CRT (Cathode Ray Tube) or LCD (Liquid Crystal Display), etc. The display apparatus 4 displays various information received by the mobile unit communication apparatus 1. In this embodiment, the display apparatus 4 is used by both the navigation apparatus 2 and the mobile unit communication apparatus 1.

An antenna 5 is connected to the mobile unit communication apparatus 1. The mobile unit communication apparatus 1 transmits radio waves to other vehicles or to fixed stations (fixed communication apparatus) installed in the road for carrying out road-to-vehicle communication via the antenna 5. Further, the mobile unit communication apparatus 1 receives radio waves transmitted from other vehicles or fixed stations.

The mobile unit communication apparatus 1 is equipped with a camera 6. The complexity of images taken by the camera 6 is analyzed by an image processing unit 7. The results of analyzing by the image processing unit 7 are transmitted to a relay wait time processing unit 15.

The mobile unit communication apparatus 1 is equipped with a vehicle ID producing unit 11, a sequence number producing unit 12, and a vehicle information acquiring unit 13, mainly for generating vehicle information for transmitting to other vehicles etc. Further, the mobile unit communication apparatus 1 is equipped with a transmission processing unit 14, the relay wait time processing unit 15, a relay processing unit 16, and a receiving processing unit 17, for carrying out communication processing. The mobile unit communication apparatus 1 is equipped with a vehicle table 18 that stores vehicle information and received information, and a display processing unit 8 that displays received information etc. at the display apparatus 4.

Further, the mobile unit communication apparatus 1 is equipped with a wireless transceiver 9. The wireless transceiver 9 carries out wireless communication of information (transmitting and receiving) via the antenna 5 with other vehicles positioned within a range that signals from the vehicle can reach using a predefined wireless communication output value.

The wireless transceiver 9 communicates using, for example, CSMA/CA (Carrier Sense Multiple Access with Collision Avoidance). At a wireless LAN, because it is not possible to detect collisions (collisions of signals flowing on the same line), each terminal transmits data after confirming that a communication path has been continuously free for a fixed time or more. The wait time for this confirmation is a minimum time with a time of a random length added. By adding a time of a random length, it is possible to prevent a situation where a number of terminals are transmitting together at a fixed time from the immediately previous communication. The mobile unit communication apparatus 1 of this embodiment sets the minimum wait time long in proportion to the likelihood of an impediment to communication.

Figure 2:
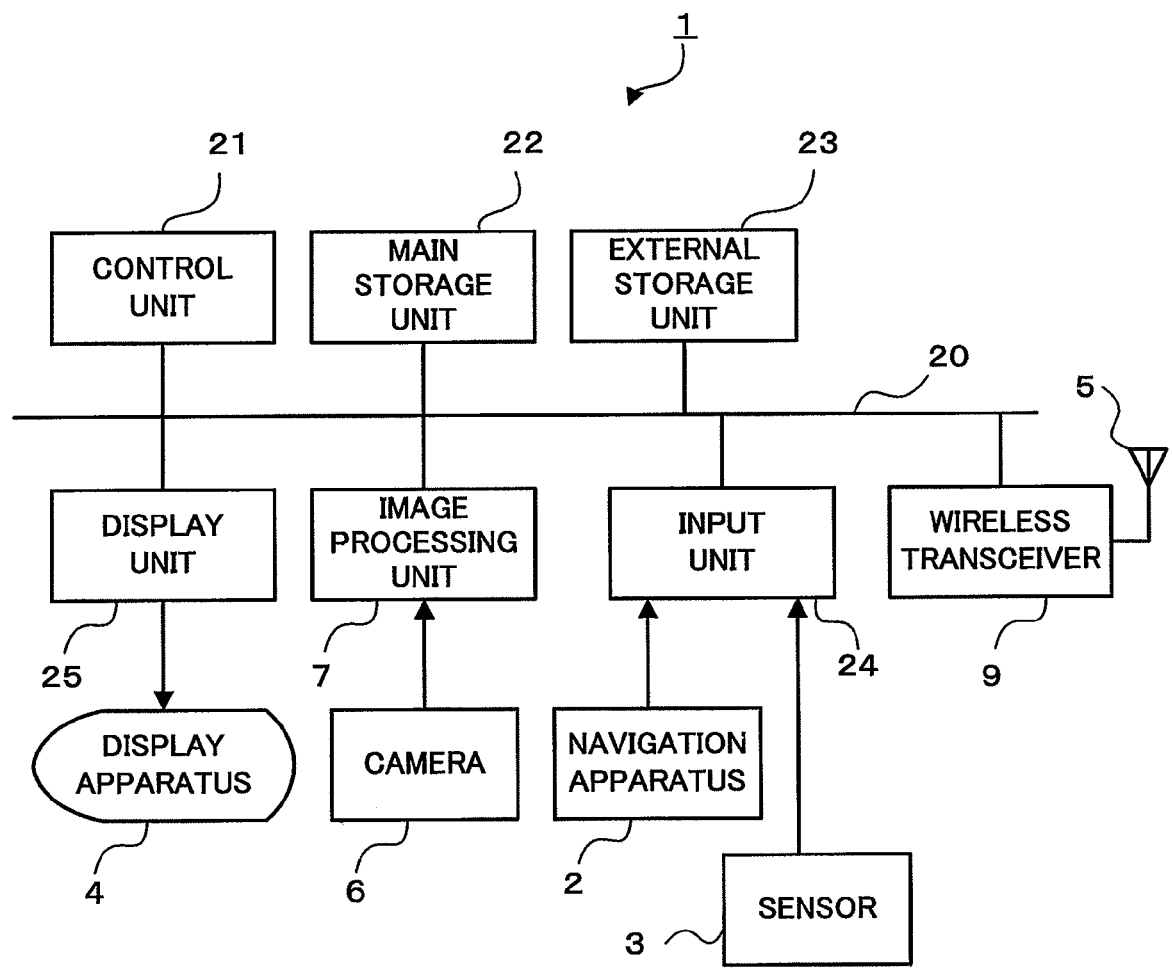
FIG. 2 is a block diagram showing an example configuration of a mobile unit communication apparatus of the embodiment of the present invention implemented by a computer.

The mobile unit communication apparatus 1 can be configured using a microcomputer. FIG. 2 is a block diagram showing an example configuration of the mobile unit communication apparatus 1 implemented by a microcomputer. As shown in FIG. 2, the mobile unit communication apparatus 1 is equipped with a control unit 21, main storage unit 22, external storage unit 23, camera 6, image processing unit 7, input unit 24, display unit 25, and wireless transceiver 9. The main storage unit 22, external storage unit 23, input unit 24, image processing unit 7, display unit 25 and wireless transceiver 9 are connected to the control unit 21 via an internal bus 20.

The control unit 21 is constituted from a CPU (Central Processing Unit), etc. The control unit 21 executes relay processing, etc. described in the following in accordance with a program stored in the external storage unit 23.

The main storage unit 22 is constituted by a RAM (Random-Access Memory), etc. The main storage unit 22 loads the program stored in the external storage unit 23 and is used as a work area for the control unit 21.

The external storage unit 23 is constituted by non-volatile memory such as flash memory, a hard disc, DVD-RAM (Digital Versatile Disc Random-Access Memory), or DVD-RW (Digital Versatile Disc Rewritable), etc. The external storage unit 23 stores a program in advance for executing processing at the control unit 21. Further, the external storage unit 23 stores data, supplies the stored data to the control unit 21 under the instruction of the control unit 21, and further stores data processed in accordance with the program and supplied by the control unit 21.

The input unit 24 is configured from a serial interface or LAN (Local Area Network) interface that connects the navigation apparatus 2 and each sensor 3 of the vehicle 50. The current time, position, direction of travel, and speed, etc. of the vehicle 50 is inputted to the input unit 24 from the navigation apparatus 2. Further, information notified by the sensor 3 is inputted to the input unit 24. Information inputted to the input unit 24 is supplied to the control unit 21.

The display unit 25 is comprised of image memory holding display data that is information displayed at the display apparatus 4 and an interface circuit that transmits display data to the display apparatus 4. It is then possible to display information at the display apparatus 4 by writing data for the image displayed at the display apparatus 4 to the image memory.

The image processing unit 7 is comprised of an input interface that inputs an image signal from the camera 6 and an arithmetic unit that subjects the image signal to analysis processing. The arithmetic unit can be configured from a DSP (Digital Signal Processor), etc.

The image processing unit 7 determines the likelihood of the presence of various impediments to communication blocking the wireless signals such as buildings and walls surrounding the vehicle based on the image signal inputted by the camera 6. The determination method (detection method) is carried out by obtaining the complexity of the surrounding environment based on the distribution of change of brightness contained in the image signal. Namely, the image processing unit 7 divides an image up and sets a number of regions. Next, the image processing unit 7 determines whether or not the brightness of each pixel is uniform within each set region. The image processing unit 7 then further divides regions where the brightness is determined to not be uniform and sets new regions. The image processing unit 7 repeatedly divides up the regions and sets new regions until the brightness is determined to be uniform. The image processing unit 7 then calculates the number of regions (surrounding objects) where the brightness of each pixel has become uniform. The likelihood of an impediment to communication can then be determined by, for example, depending on which level the number of separated regions a photographed image falls into when classifying the number of separated regions for images into several levels.

The camera 6 can be installed on each part of the vehicle 50 and takes images of the surroundings of the vehicle 50. FIGS. 3A to 3G are plan views depicting examples of positions where the camera 6 can be fitted to the vehicle 50 and the range V photographed by the camera 6.

Figure 3A:
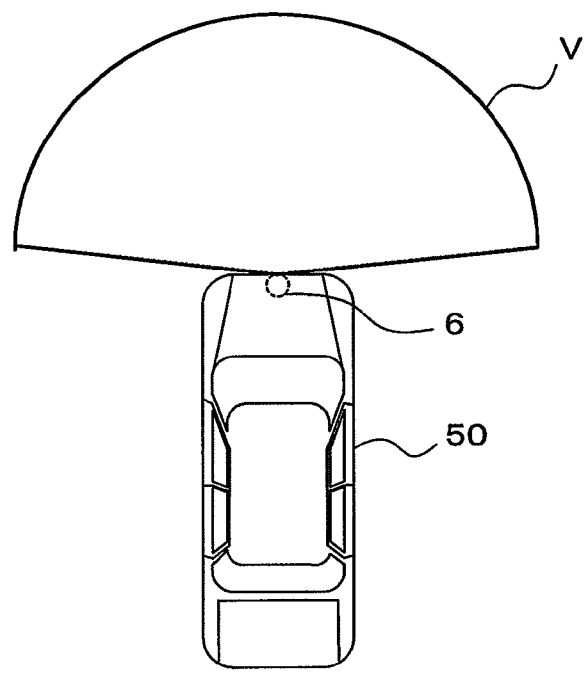
FIG. 3A is a plan view depicting an example of photographing range when photographing to the front of a vehicle using a camera fitted to the front part of a vehicle.
Figure 3B:
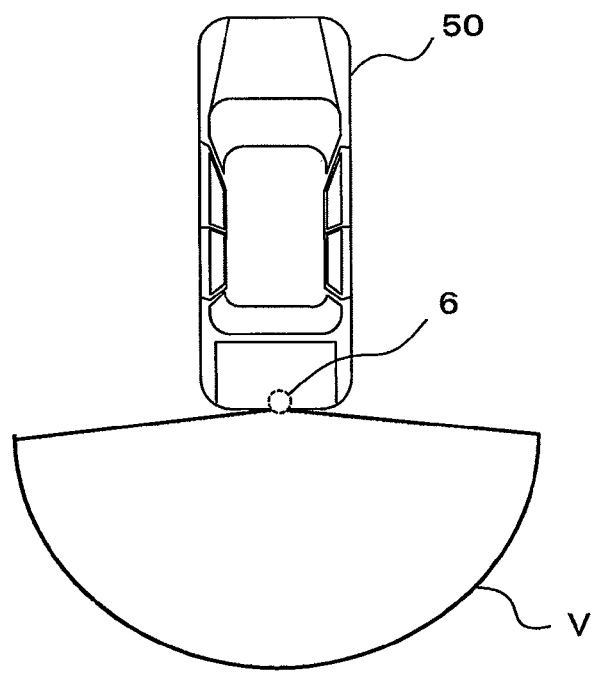
FIG. 3B is a plan view depicting an example of photographing range when photographing to the rear of a vehicle using a camera fitted to the rear part of a vehicle.
Figure 3C:
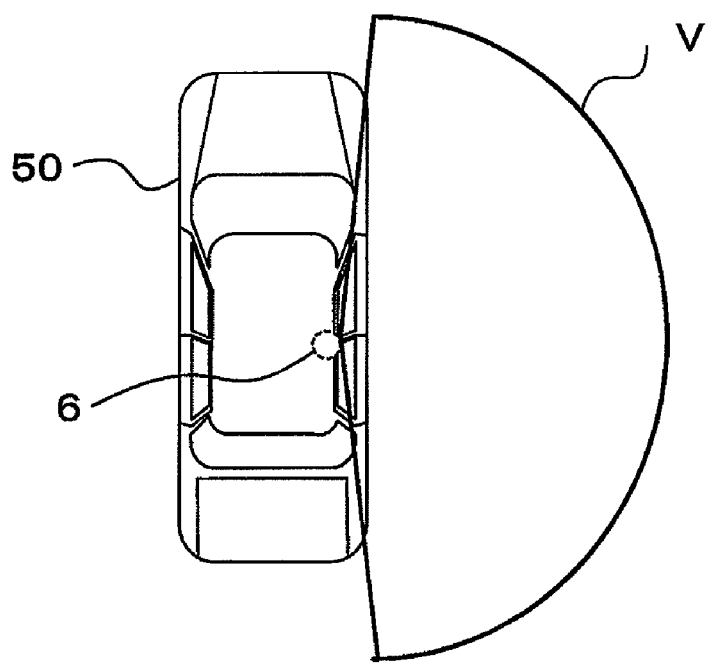
FIG. 3C is a plan view depicting an example of the photographing range when photographing to the right side of a vehicle using a camera fitted to the right side of a vehicle.
Figure 3D:
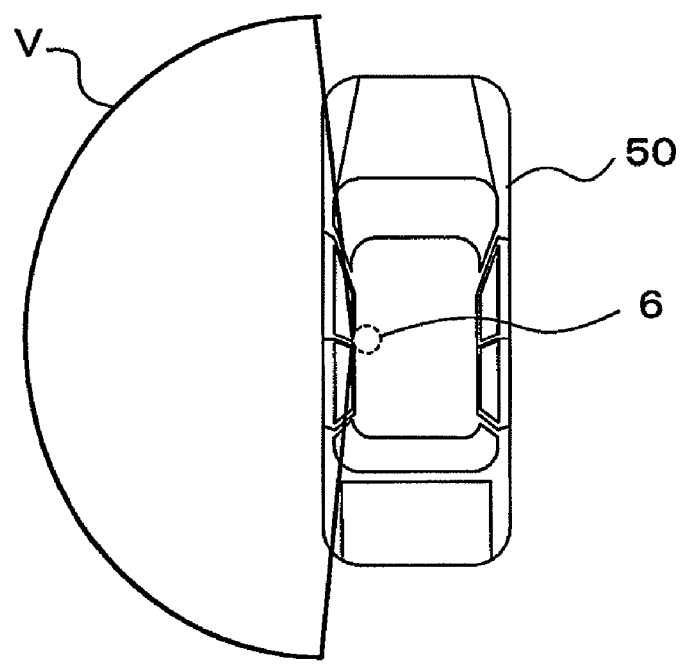
FIG. 3D is a plan view depicting an example of the photographing range when photographing to the left side of a vehicle using a camera fitted to the left side of a vehicle.
Figure 3E:
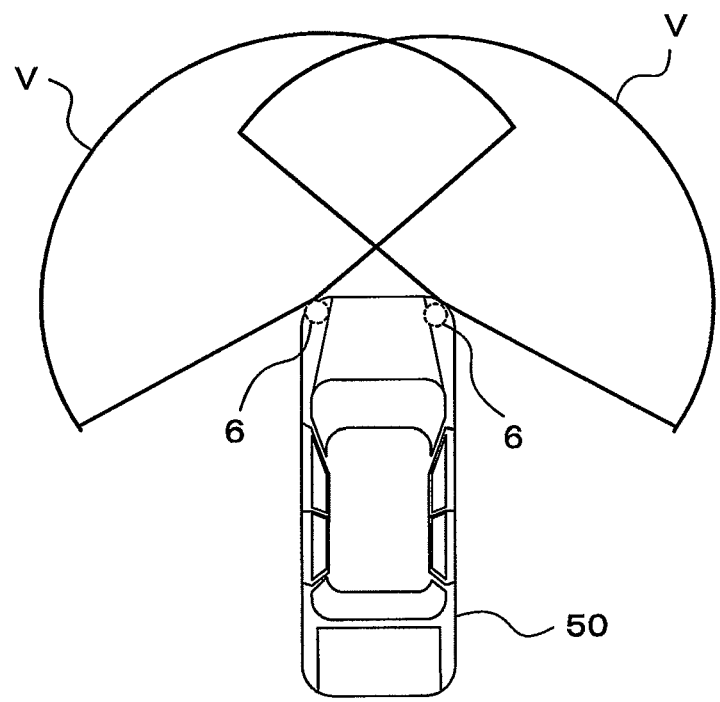
FIG. 3E is a plan view depicting an example of the photographing range when photographing to the front side of a vehicle using cameras fitted to the front right and front left of the vehicle.
Figure 3F:
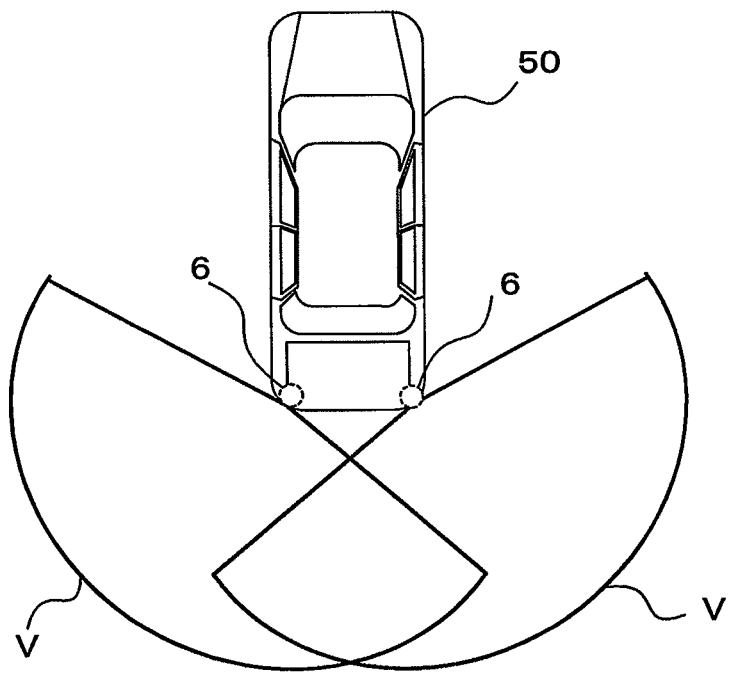
FIG. 3F is a plan view depicting an example of the photographing range when photographing to the rear side of a vehicle using cameras fitted to the back right and back left of a vehicle.
Figure 3G:
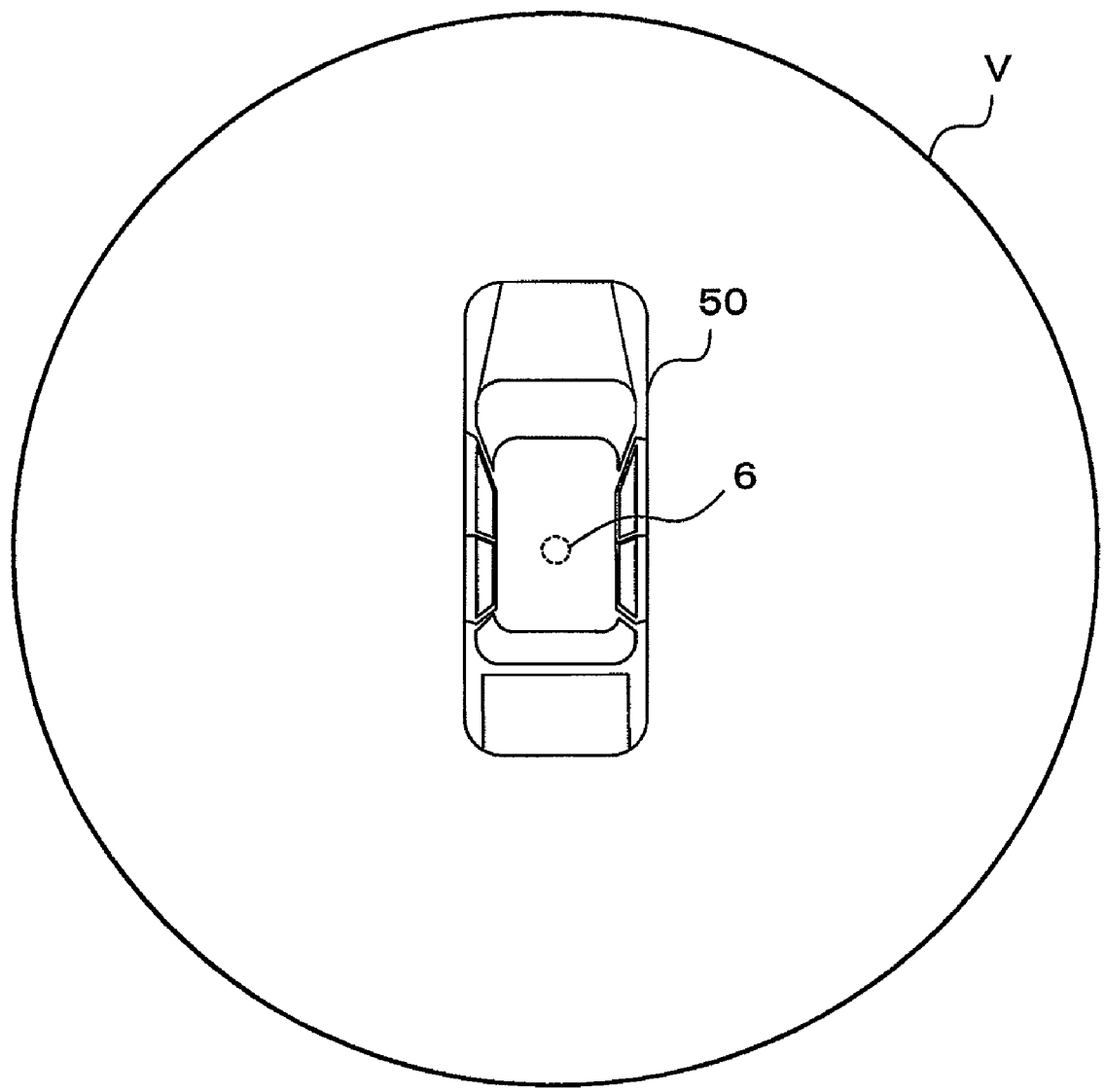
FIG. 3G is a plan view depicting an example of the photographing range when photographing the entire periphery of a vehicle using a camera fitted to an upper part of the center of a vehicle.

FIG. 3A shows the case where the camera 6 is fitted to the front part of the vehicle 50 and photographs to the front of the vehicle 50. FIG. 3B shows the case where the camera 6 is fitted to the rear part of the vehicle 50 and photographs to the rear of the vehicle 50. FIG. 3C shows the case where the camera 6 is fitted to the right side of the vehicle 50 and photographs to the right side of the vehicle 50. FIG. 3D shows the case where the camera 6 is fitted to the left side of the vehicle 50 and photographs to the left side of the vehicle 50. FIG. 3E shows the case where the camera 6 is fitted to the front right and the front left of the vehicle 50, and photographs to the front right and to the front left (collectively referred to as the front side) of the vehicle 50. FIG. 3F shows the case where cameras 6 are fitted to the rear right and the rear left of the vehicle 50, and photograph to the rear right and to the rear left (collectively referred to as the rear side) of the vehicle 50. FIG. 3G shows the case where a camera is fitted to an upper part of the center of the vehicle 50 and photographs the entire periphery of the vehicle 50. The position of attaching the camera 6 is not limited to that shown in FIGS. 3A to 3G and the camera 6 can also be fitted to a combination of these positions. For example, cameras 6 can be fitted to the front part, the rear part, the right side, and the left side of the vehicle 50, with images being captured from the respective cameras.

Figure 4A:
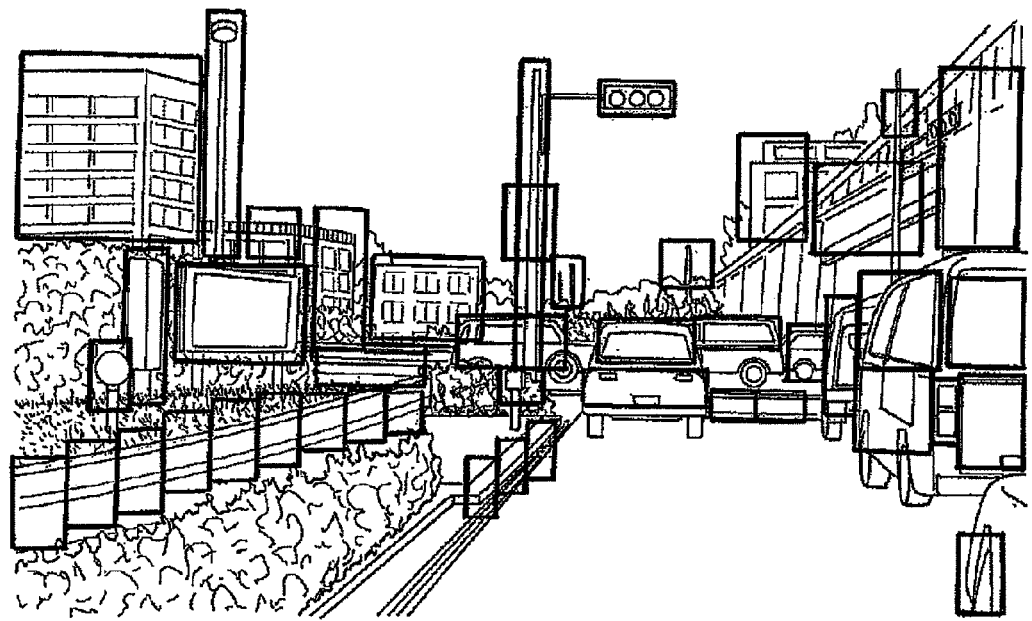
FIG. 4A is a view showing a example where a photographed image is divided up into images for a number of regions according to brightness when the number of regions is comparatively large.
Figure 4B:
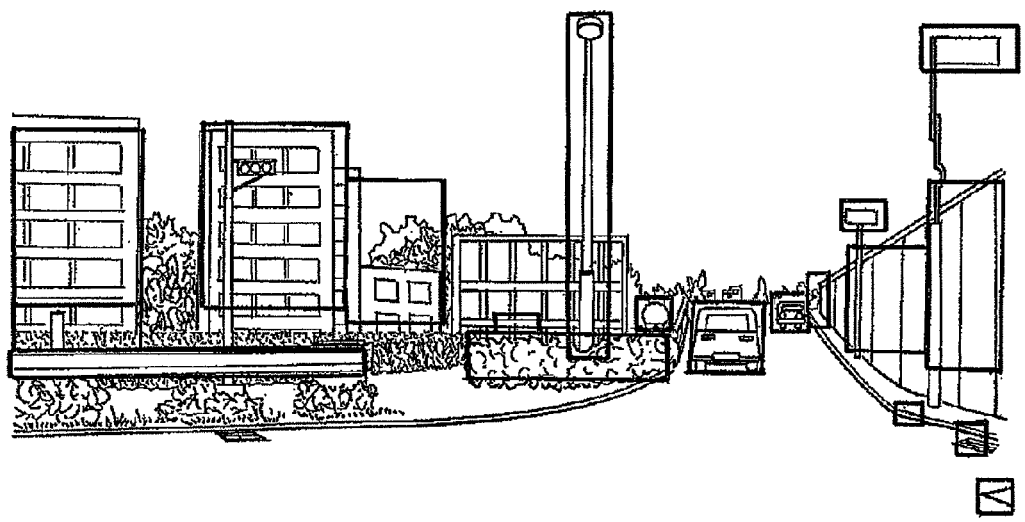
FIG. 4B is a view showing a example where a photographed image is divided up into images for a number of regions according to brightness when the number of regions is comparatively small.

FIGS. 4A and 4B are diagrams showing examples where images taken by the camera 6 are divided up into a number of regions according to brightness by the image processing unit 7. FIG. 4A shows an example of where the number of divided regions is comparatively large, and FIG. 4B shows an example of the case where the number of divided regions is comparatively small. It is possible to determine the likelihood of an impediment to communication using the number of divided regions. Images for to the front of the vehicle 50 are shown in FIGS. 4A and 4B. However, it is also possible, for example, to combine images to the front and to the left and right of the vehicle 50. In this case, it is possible to determine the likelihood of impediments to communication using the total number of regions the images are divided into or a weighting total, etc.

The vehicle ID producing unit 11, sequence number producing unit 12, vehicle information acquiring unit 13, transmission processing unit 14, relay wait time processing unit 15, relay processing unit 16, receiving processing unit 17, vehicle table 18, and display processing unit 8 of the mobile unit communication apparatus 1 of FIG. 1 are implemented by the control unit 21, main storage unit 22, external storage unit 23, input unit 24, display unit 25 and a computer program operated by the control unit 21 at the mobile unit communication apparatus 1 of FIG. 2.

Next, a description is given of the operation of the mobile unit communication apparatus 1 shown in FIG. 1 or 2 with reference to FIG. 5 to FIG. 12. As shown above, the operation of the mobile unit communication apparatus 1 is carried out by the control unit 21 operating in cooperation with the main storage unit 22, external storage unit 23, image processing unit 7, input unit 24, display unit 25, and wireless transceiver 9.

Figure 5:
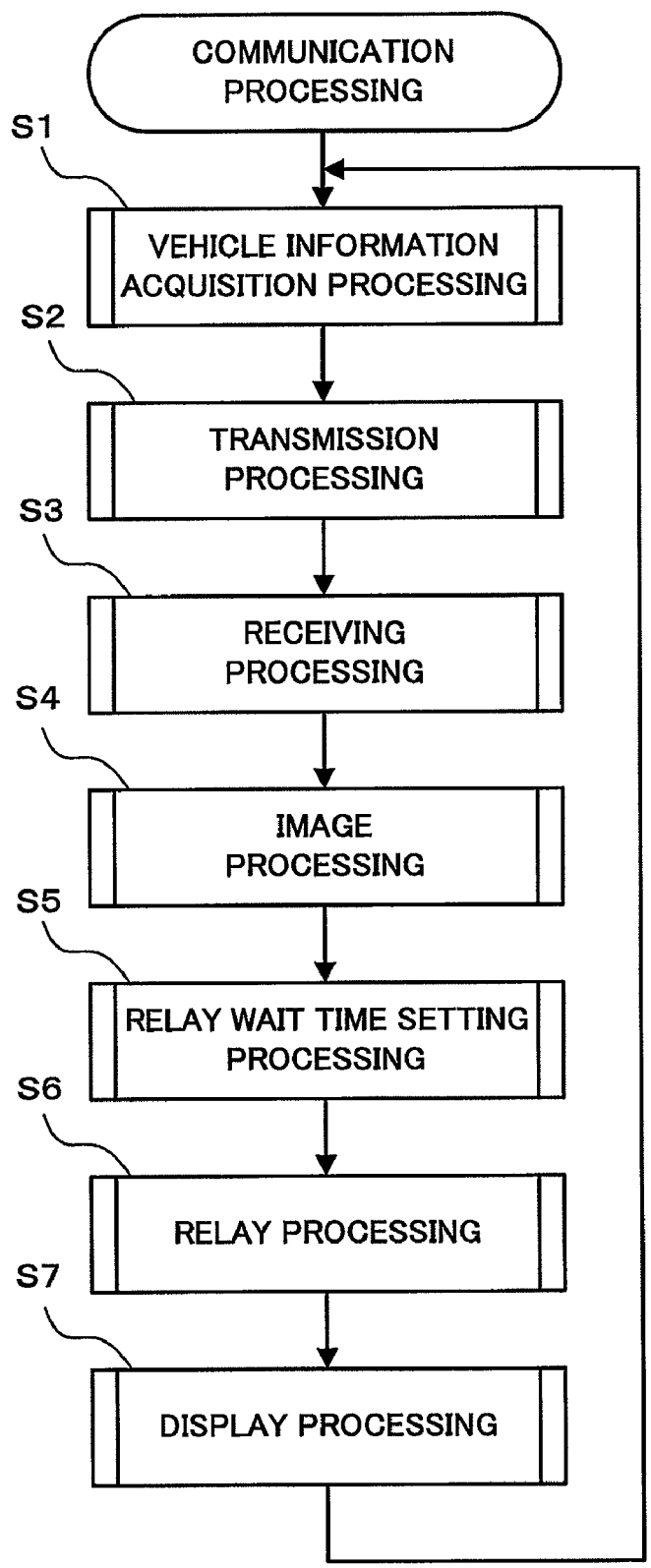
FIG. 5 is a flowchart showing an outline of an example operation for communication processing that communicates information of a vehicle in a mobile unit communication apparatus of the embodiment of the present invention.

FIG. 5 is a flowchart showing an outline of an example operation for communication processing that communicates information of the vehicle 50 in the mobile unit communication apparatus 1 of the embodiment of the present invention.

The control unit 21 of the mobile unit communication apparatus 1 acquires various information (vehicle information) for the vehicle 50 from the navigation apparatus 2 and the sensor 3 (step S1). Next, the control unit 21 assigns a vehicle number (vehicle ID) and communication sequence number to the information and transmits the information from the wireless transceiver 9 (step S2). The control unit 21 then receives data sent from other mobile units (or fixed communication apparatus) (step S3).

Next, the control unit 21 reads in an image signal for the surroundings of the vehicle 50 from the camera 6, processes the image at the image processing unit 7 and calculates a number of divided regions (step S4). The control unit 21 then determines the likelihood of an impediment to communication from the number of divided regions taken as the image processing results and sets the wait time (relay wait time) for up to relay communication of the received information based on the determination results (step S5).

After the set wait time has passed, the control unit 21 compares information received during the wait time and information to be relayed and carries out relaying (step S6).

The control unit 21 processes the received information for display at the display apparatus 4 via the display unit 25 (step S7). The operation of step S1 to step S7 is then repeated.

Next, the content of each of the processes of step S1 to step S7 is described in detail.

Figure 6:
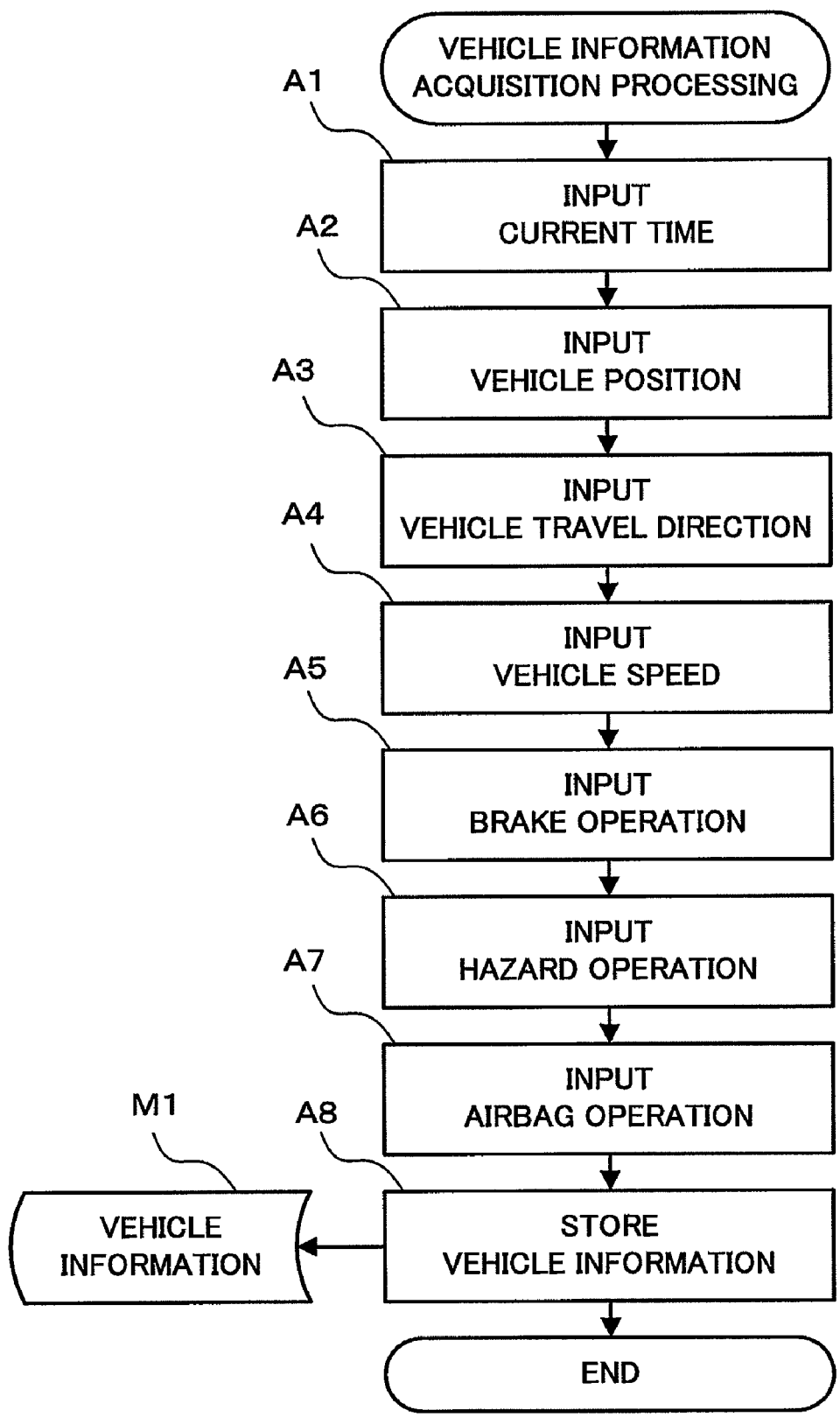
FIG. 6 is a flowchart showing an example operation for vehicle information acquisition processing.

FIG. 6 is a flowchart showing an example operation for the vehicle information acquisition processing of step S1. The control unit 21 inputs current time information from the navigation apparatus 2 via the input unit 24 (step A1). Similarly, the control unit 21 inputs position information for the vehicle 50 (step A2), inputs travel direction information for the vehicle 50 (step A3), and inputs speed information for the vehicle 50 (step A4). Speed information for the vehicle 50 can also be inputted from speed sensors provided at the wheels, etc.

Next, the control unit 21 inputs information (brake operation information) as to whether or not the brakes are operating from the sensor 3 of the vehicle 50 via the input unit 24 (step A5). Similarly, the control unit 21 inputs information (hazard lamp operation information) as to whether or not the hazard lamps are operating (step A6) and inputs information (airbag operation information) as to whether or not the air bag is operating (step A7).

Finally, the control unit 21 stores vehicle information (data M1) that is various information for the vehicle 50 inputted in steps A1 to A7 in the main storage unit 22 and/or the external storage unit 23 (step A8).

Figure 7:
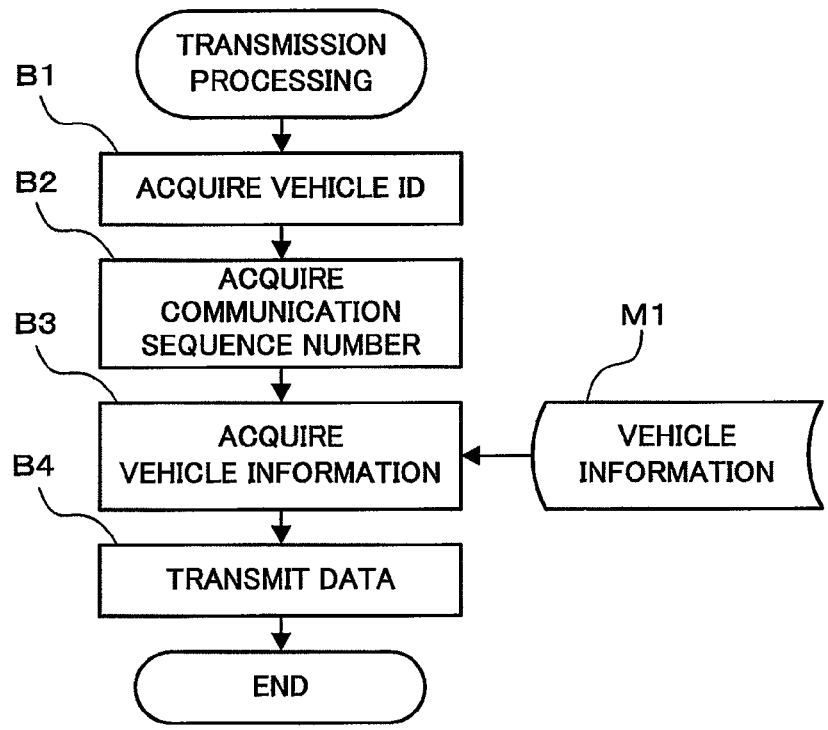
FIG. 7 is a flowchart showing an example operation for transmission processing.

FIG. 7 is a flowchart showing an example operation for the transmission processing of step S2 of FIG. 5. The control unit 21 acquires an ID of the vehicle 50 made by the vehicle ID producing unit 11 that is stored in the external storage unit 23 (step B1). Further, the control unit 21 acquires a communication sequence number given to the information transmitted next from the main storage unit 22 (step B2). The communication sequence number is then stored in the main storage unit 22 and is increased one at a time by the sequence number producing unit 12 each time vehicle information is sent. The communication sequence number is cleared to 0 if an upper limit value is reached. The data that is communicated can be specified by combining the vehicle ID and the communication sequence number. For example, when the same data as data initially transmitted from the vehicle is relayed, it is possible to determine that this is the same data by identifying data based on the vehicle ID and the communication sequence number.

Next, the control unit 21 acquires vehicle information (data M1) stored in the main storage unit 22 or the external storage unit 23 using the vehicle information acquisition processing shown in FIG. 6 (step B3). The control unit 21 then transfers the vehicle ID, communication sequence number and vehicle information acquired in steps B1 to B3 to the wireless transceiver 9 and transmits the transferred data from the wireless transceiver 9 (step B4).

Figure 8:
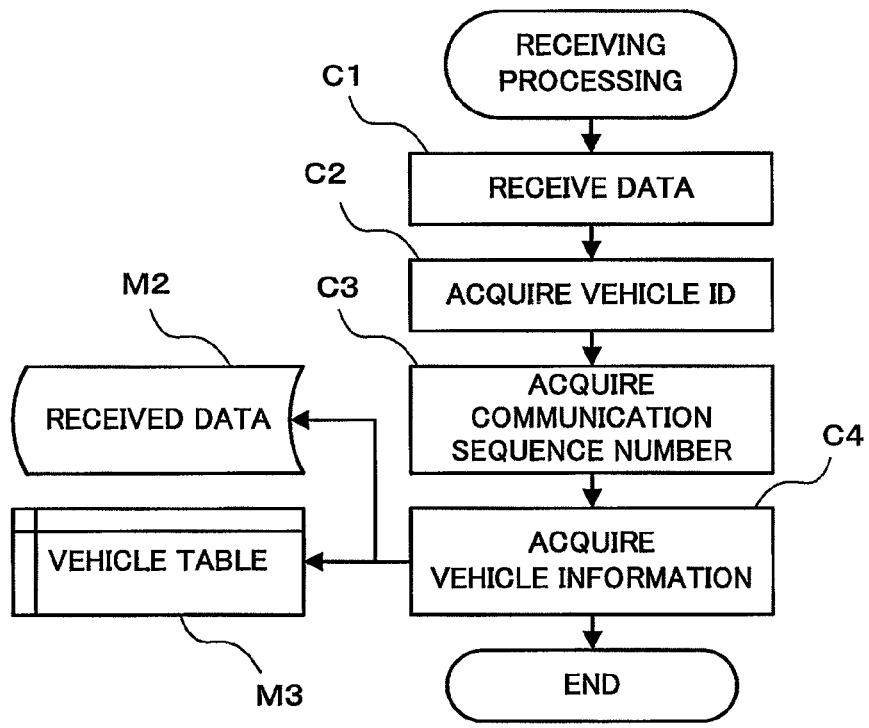
FIG. 8 is a flowchart showing an example operation for receiving processing.

FIG. 8 is a flowchart showing an example operation for the receiving processing of step S3 of FIG. 5. First, the control unit 21 inputs data received by the wireless transceiver 9 from the wireless transceiver 9 (step C1). The control unit 21 then acquires the vehicle ID from the received data (step C2). Further, the control unit 21 acquires the communication sequence number from the received data (step C3). As described above, it can then be determined whether or not the received data is the same data as already received data using the vehicle ID and the communication sequence number.

The control unit 21 acquires vehicle information from the received data (step C4). The control unit 21 then stores the received data (data M2) in the main storage unit 22. Further, the control unit 21 stores the vehicle information in a vehicle table (data M3) set in the external storage unit 23 in a manner correlated with the vehicle ID and the communication sequence number. The number of times the data is received can also be stored in the vehicle table. An initial value for the number of times received is 1. When data correlated to a vehicle ID and a communication sequence number that are the same as the vehicle ID and the communication sequence number of the received data already exists in the vehicle table, the control unit 21 adds 1 to the number of times this data is received stored in the vehicle table.

Figure 9:
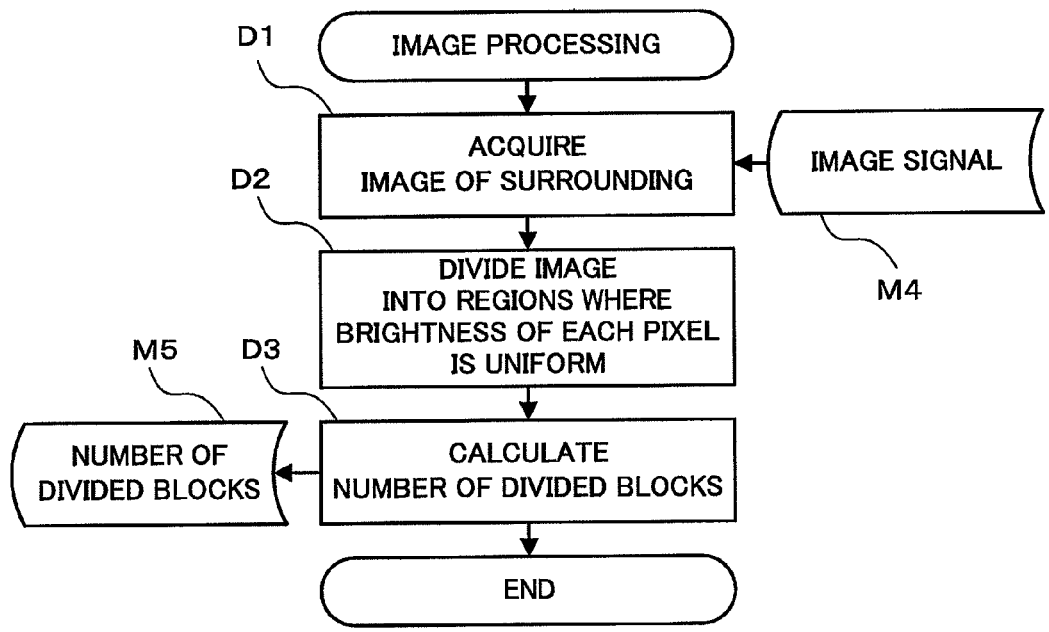
FIG. 9 is a flowchart showing an example operation for image processing.

FIG. 9 is a flowchart showing an example operation for the image processing of step S4 of FIG. 5. The image processing unit 7 acquires an image signal (data M4) for an image of the surroundings from the camera 6 (step D1). As described above, the image processing unit 7 then divides the image into regions where the brightness of each pixel is uniform based on the distribution of change of brightness contained in the image signal (step D2). Specifically, the image processing unit 7 divides the image of the surroundings into regions where the brightness of pixels in close proximity is similar. The image processing unit 7 then calculates the number of divided regions (number of divided blocks), and the control unit 21 stores the calculated the number of divided blocks (data M5) in the main storage unit 22 (step D3). Namely, the control unit 21 assumes that regions where the brightness of each pixel is uniform are surrounding objects and bases determination of the number of impediments to communication existing around the vehicle on this number of regions.

Figure 10:
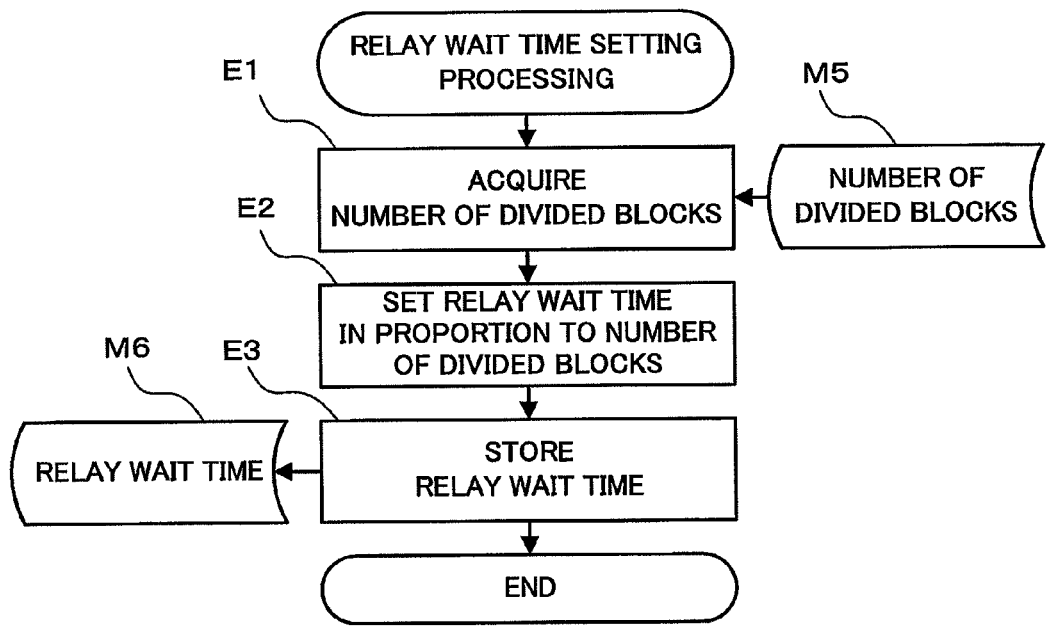
FIG. 10 is a flowchart showing an example of relay wait time setting processing.

FIG. 10 is a flowchart showing an example of the relay wait time setting processing of step S5 of FIG. 5. The control unit 21 acquires the number of divided blocks (data M5) calculated in the image processing shown in FIG. 9 (step E1). The control unit 21 then sets the relay wait time in proportion to the number of divided blocks (step E2). As described above, the relay wait time can also be set according to a number of levels classified according to the number of divided blocks. Further, it is also possible for the relay wait time to be set by adding a time proportional to the number of divided blocks to the preset minimum wait time. The control unit 21 then stores the set relay wait time (data M6) in the main storage unit 22 (step E3). The relay wait time is set to be longer for a larger likelihood of an impediment to communication using the relay wait time setting processing.

Figure 11:
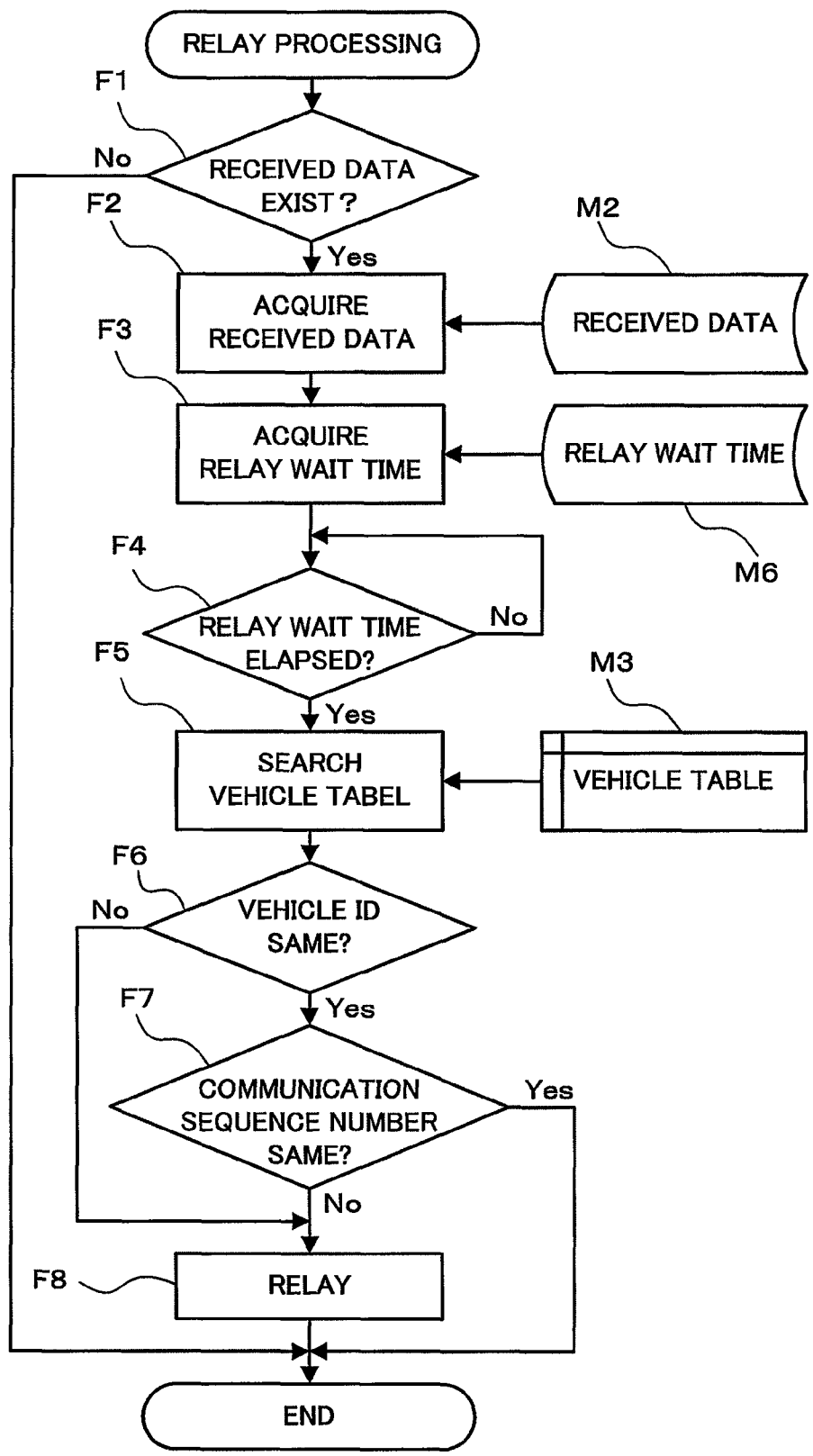
FIG. 11 is a flowchart showing an example operation for relay processing.

FIG. 11 is a flowchart showing an example operation for the relay processing of step S6 of FIG. 5. The control unit 21 determines whether or not received data (data M2) is stored in the main storage unit 22 (step F1). If the received data is not in the main storage unit 22 (step F1; No), it is not necessary to relay the data and the control unit 21 ends relay processing. When received data exists in the main storage unit 22 (step F1; Yes), the control unit 21 acquires the received data (data M2) stored in the main storage unit 22 (step F2).

Next, the control unit 21 acquires the relay wait time (data M6) set in the relay wait time setting processing shown in FIG. 10 from the main storage unit 22 (step F3). The control unit 21 then waits for this relay wait time to elapse (step F4; No). When the wireless transceiver 9 communicates using CSMA/CA, the relay wait time is taken to be the relay wait time set in the relay wait time setting processing with a random time added.

If the relay wait time has elapsed (step F4; Yes), the control unit 21 searches the vehicle table (data M3) and acquires vehicle IDs and communication sequence numbers of data where the number of times received is two or more (step F5). The control unit 21 then determines whether or not the vehicle ID for the received data acquired in step F2 and the vehicle ID of data where the number of times received is two or more is the same (step F6). If there is no vehicle ID for the received data acquired in step F2 in the vehicle IDs of data where the number of times received is two or more (step F6; No), then the same data has not been received during the relay wait time, and the control unit 21 relays the received data (step F8).

When there is a vehicle ID for the received data acquired in step F2 in the vehicle IDs of data where the number of times received is two or more (step F6; Yes), the control unit 21 determines whether or not the communication sequence number of data, where the number of times received is two or more and vehicle IDs are the same as for the received data, is the same as the communication sequence number of the received data (step F7). If the communication sequence number is not the same (step F7; No), the control unit 21 relays the received data (step F8). If the communication sequence number is the same (step F7; Yes), it can be considered that existing relay processing has been carried out by other vehicles in the vicinity of the vehicle. The control unit 21 then ends the relay processing without relaying the received data.

Figure 12:
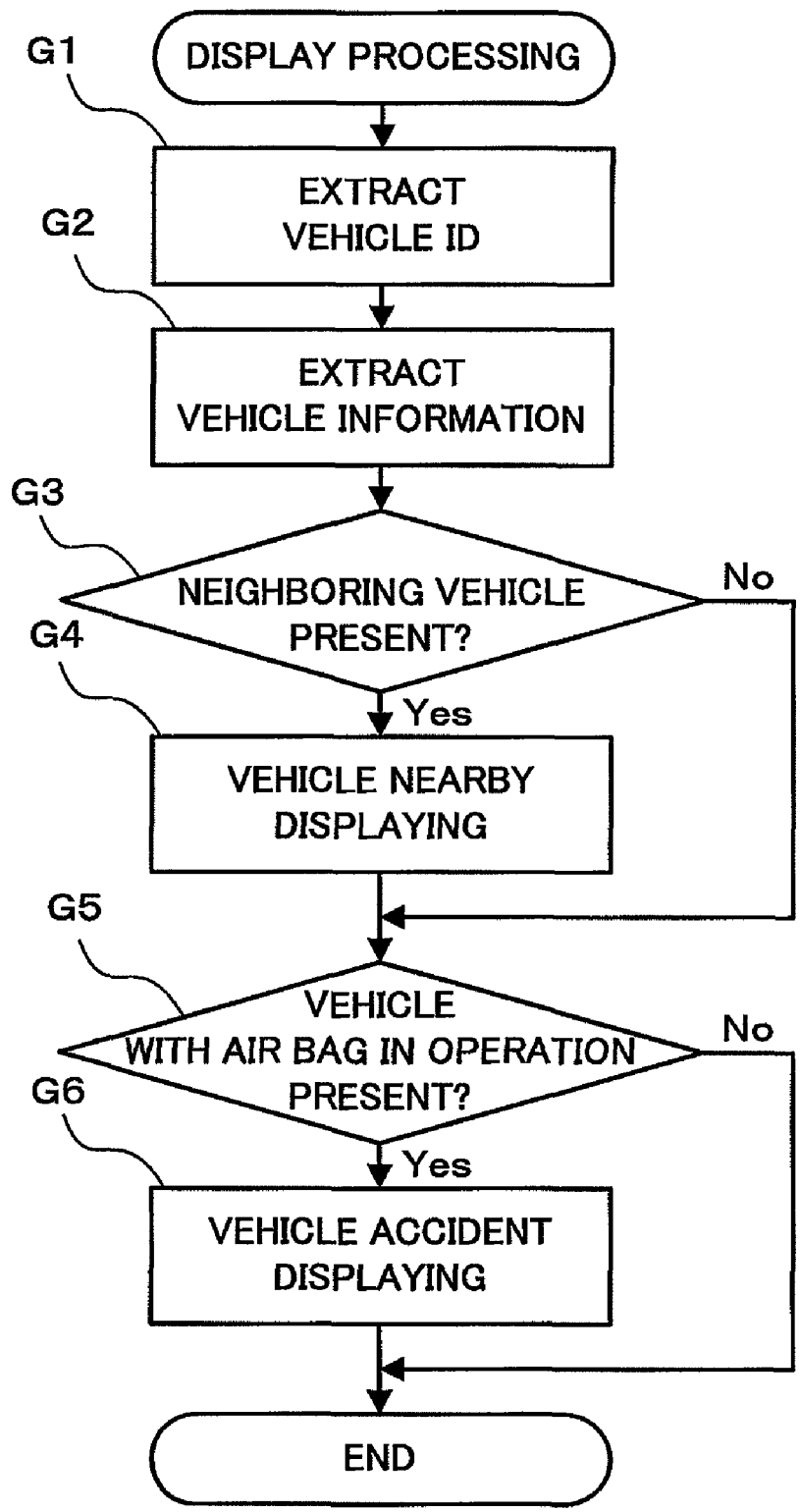
FIG. 12 is a flowchart showing an example operation for display processing.

FIG. 12 is a flowchart showing an example operation for the display processing of step S7 of FIG. 5. The control unit 21 extracts the vehicle IDs and vehicle information correlated to the vehicle IDs from the vehicle table (step G1, step G2). Next, the control unit 21 determines whether or not a neighboring vehicle is present based on the position information etc. included in the extracted vehicle information (step G3). When it is determined that a vehicle is nearby (step G3; Yes), the control unit 21 displays that a vehicle is nearby at the display apparatus 4 (step G4) and invites the driver to take care. If there is no vehicle nearby (step G3; No), it is not displayed that there is a vehicle nearby.

Next, the control unit 21 determines whether or not a vehicle with an air bag in operation is present based on the airbag operation information included in the extracted vehicle information (step G5). When a vehicle where an air bag is in operation is present (step G5; Yes), the control unit 21 displays the presence of a vehicle that has been in an accident at the display apparatus 4 (step G6). When a vehicle where an air bag is in operation is not present (step G5; No), the control unit 21 does not carry out vehicle accident displaying. In, or in addition to, vehicle accident displaying, the control unit 21 can also display the presence of a vehicle where the brakes are in operation or where the hazard lamps are in operation at the display apparatus 4 based on brake operation information or hazard lamp operation information included in the vehicle information. In addition, the control unit 21 can analyze the vehicle table and display congestion information when it is determined that there is congestion in the direction of travel of the vehicle 50.

Figure 13:
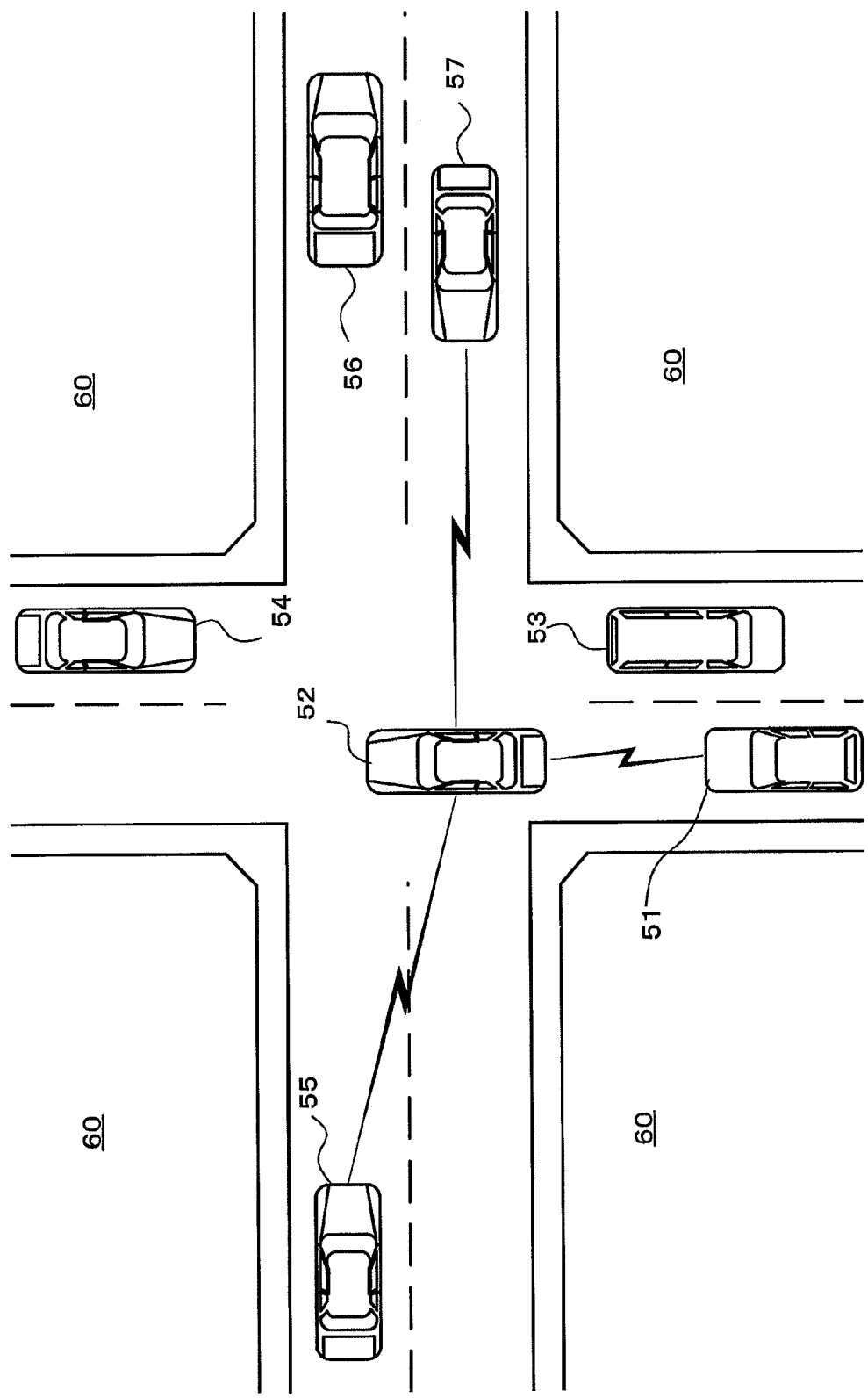
FIG. 13 is a diagram schematically depicting a situation when communication is carried out by a mobile unit communication apparatus of the embodiment of the present invention in the vicinity of an intersection.

The above communication processing is described using FIG. 13. FIG. 13 is a diagram schematically depicting the situation when communication is carried out by the mobile unit communication apparatus 1, in, for example, the vicinity of an intersection. Vehicle 52 of vehicles 51 to 57 is positioned in the middle of an intersection. There are also not impediments to communication such as a building 60 that blocks wireless signals surrounding (specifically in a lateral direction) of the vehicle 52. The relay wait time of the vehicle 52 is therefore set to be the shortest for the vehicles 51 to 57. The building 60 is an impediment to communication in a lateral direction of each vehicle for the vehicles 51, and 53 to 57, other than the vehicle 52. Relay wait times that are at least longer than the vehicle 52 are then set at each vehicle.

As a result, relay processing for the vehicle 52 is carried out instantaneously without competition from relay processing of nearby vehicles. Vehicles other than the vehicle 52 therefore receive information subjected to relay processing at the vehicle 52. This means that a vehicle does not carry out its own relay processing and congestion is not caused by communication of the same content.

For example, when information sent by the vehicle 51 cannot be directly transmitted to a vehicle 55 and the vehicle 57 because of the building 60 etc., the information is instantaneously relayed by the vehicle 52 and is transmitted to the vehicle 55 and the vehicle 57. Conversely, information sent by the vehicle 55 or the vehicle 57 is transmitted to the vehicle 51 as a result of relaying by the vehicle 52. The vehicle 51, vehicle 55 or 57 display the presence of a vehicle near the intersection at the display apparatus 4 based on the transmitted information and invites the drivers to take care. It is therefore anticipated that this will have the effect of preventing accidents at the meeting of the intersection before they happen.

The gap (turnaround time) between on vehicle transmitting vehicle information is, for example, 50 msec to 300 msec. The relay wait time is, for example, 100 msec to 500 msec. The time from a vehicle being 50 m from an intersection to entering the intersection is approximately 3 seconds. It is therefore possible for a driver to start decelerating even when relaying is carried out once during this time so that information for other nearby vehicles is sent to one vehicle.

It is also possible to decide an upper limit for the number of times of relaying in order to prevent endless relaying of one item of information. When the upper limit for the number of times of relaying is taken to be, for example, 4, the mobile unit communication apparatus 1 sending the first information performs transmission after adding 4 to the information as the remaining number of times of relaying. At the time of relaying, the mobile unit communication apparatus 1 performing the relaying subtracts 1 from the remaining number of times of relaying and sends the information. The mobile unit communication apparatus 1 does not carry out relaying upon receiving information where the number of times of relaying is 0.

The upper limit for the number of times of relaying can be decided for each layer of the OSI basic reference model. The upper limit of the number of times of relaying can, for example, be decided independently for the network layer and the transport layer. Information for vehicles close to the intersection (time, vehicle position, direction of travel of vehicle, vehicle speed, etc.) may be information for nearby vehicles, and may have a low number of relaying. Therefore, it is possible to decide a low number of times of relaying, for example, for just the network layer. Setting is also possible where congestion information and accident information, etc. can be relayed to far away by increasing the number of times of relaying decided for the network layer and the transport layer, respectively.

In the above description, the mobile unit communication apparatus 1 of the embodiment of the present invention carries out relaying more rapidly for vehicles surrounded by fewer impediments to communication and carries out relaying more slowly for vehicles surrounded by more impediments to communication. It is therefore possible to carry out rapid and reliable multi-hop communication between vehicles. Namely, rapid and efficient communication is possible even when direct communication between vehicles is not possible due to impediments to communication such as the building 60 blocking signals. Further, according to the mobile unit communication apparatus 1 of the embodiment of the present invention, vehicles that receive the same information again do not relay this information. Relaying where the same information is repeatedly relayed nearby is therefore avoided. It is therefore possible to reduce wireless network congestion compared to the case where hopping takes place at the communication apparatus of each vehicle in an unregulated manner.

In this embodiment, vehicle information includes information for vehicle position, direction of travel, and speed. However, the information included in the vehicle information is by no means limited in this respect. For example, the vehicle information can include warning information issued depending on the intent of the driver or information based on images taken by the camera 6.

In this embodiment, the image processing unit 7 divides up image taken into a number of images based on brightness and the calculates image complexity. The likelihood of the presence of an impediment to communication surrounding the vehicle is detected using the results of this calculating operation. However, the method for detecting the likelihood of the presence of an impediment to communication or the likelihood of an impediment to communication is by no means limited. For example, the likelihood of an impediment to communication can also be detected using a microwave Doppler radar, infrared, or sonar, etc. without depending on images taken by the camera 6.

In this embodiment, the image processing unit 7 detects the likelihood of an impediment to communication surrounding the vehicle. However, it is also possible for the control unit 21 to detect the likelihood of an impediment to communication.

In addition, the hardware configuration and flowcharts described above are an example and can be arbitrarily changed and modified.

The portions of the mobile unit communication apparatus 1 constituted by the control unit 21, the main storage unit 22, the external storage unit 23, the input unit 24, and the internal bus 20, etc. that center on performing relaying processing can also be implemented using a normal computer system rather than depending on a dedicated system. For example, a computer program for implementing the aforementioned operation can be stored and distributed on a recording medium (flexible disc, CD-ROM, DVD-ROM, etc.) readable by computer so as to configure the mobile unit communication apparatus 1 executing the above processing by installing the computer program on a computer. Further, it is also possible to configure the mobile unit communication apparatus 1 by a normal computer system that downloads a computer program stored in advance in a storage device residing in a server apparatus on a communication network such as the Internet.

Further, it is also possible to store just application program portions on a recording medium or storage device when functions of the mobile unit communication apparatus 1 are borne by an OS (Operating System) and application program, or are implemented by an OS and application program operating in unison.

Further, it is also possible for the computer program to be superimposed on a carrier wave and distributed via a communication network. For example, the computer program may be placed on a BBS (Bulletin Board System) on a communication network and distributed via the network. A configuration is also possible where a computer program is started up, and the processing is executed as a result of execution in the same way as for other application programs under the control of the OS.

In this embodiment, the camera 6 constitutes the surrounding object detection unit, the image processing unit 7 constitutes the surrounding communication impediment detection unit, the relay processing unit 16 constitutes the relay communication unit, and the relay wait time processing unit 15 constitutes the relay wait time setting unit.

Various embodiments and modifications are possible to the present invention without deviating from broad spirit and scope of the present invention. Further, the embodiment described above is to illustrate the present invention and should by no means be construed as limiting to the scope of the present invention. Namely, the scope of the present invention is as shown by the scope of the claims, not the embodiments. Various modifications implemented within the scope of the claims and within the scope of the meaning of an equivalent of the claims of the invention can be considered within the scope of the present invention.

This application is based on Japanese Patent Application No. 2005-316311 submitted on Oct. 31, 2005 and this specification, claims, drawings, and abstract are hereby incorporated herein. The disclosure of the aforementioned Japanese Patent Application is herein incorporated in its entirety in this specification by reference.

INDUSTRIAL APPLICABILITY

The present invention is useful as communication apparatus mounted on a mobile unit that moves in locations where impediments to communication exist. For example, the present invention can be applied to communication apparatus mounted on a vehicle traveling on a road where impediments to communication such as buildings exist.

The invention claimed is:

1. A mobile unit communication apparatus, including a wireless transceiver, provided at a mobile unit, comprising:
   a surrounding object detection unit that detects objects surrounding the mobile unit;
   a surrounding communication impediment detection unit that detects a likelihood of an impediment to communication in the surroundings of the mobile unit from conditions for surrounding objects detected by the surrounding object detection unit; a relay communication unit that transmits information received by the wireless transceiver from the wireless transceiver; and
   a relay wait time setting unit that sets a time until information received by the wireless transceiver is transmitted from the wireless transceiver longer at the relay communication unit for a larger likelihood of an impediment to communication detected by the surrounding communication impediment detection unit.

2. The mobile unit communication apparatus according to claim 1, wherein the surrounding object detection unit comprises a photographing unit that takes an image of surroundings of the mobile unit, and
   the surrounding communication impediment detection unit detects a likelihood of an impediment to communication based on an image taken by the photographing unit.

3. The mobile unit communication apparatus according to claim 1, wherein
   the surrounding object detection unit comprises a photographing unit that takes an image of surroundings of the mobile unit, and detects objects surrounding the mobile unit by dividing the image taken by the photographing unit into a plurality of regions according to brightness.

4. The mobile unit communication apparatus according to claim 3, wherein
the surrounding communication impediment detection unit detects a likelihood of an impediment to communication in the surroundings of the mobile unit using a number of regions that the image taken by the photographing unit are divided into by the surrounding object detection unit.

5. The mobile unit communication apparatus according to claim 2, wherein
the image taken by the photographing unit comprises an arbitrary combination of images for to the front, to the rear, to the right, to the left, to the front side, to the rear side, or images for the entire surroundings of the mobile unit.

6. The mobile unit communication apparatus according to claim 1, wherein
the relay communication unit does not transmit information from the wireless transceiver when the same information as the information received by the wireless transceiver is received again during a time, which is set by the relay wait time setting unit, until the information received by the wireless transceiver is transmitted from the wireless transceiver.

7. A computer-readable recording medium storing a program for allowing a computer, which is connected to a wireless transceiver provided at a mobile unit and a surrounding object detection apparatus that detects objects surrounding the mobile unit, to execute:
a surrounding object detection step of detecting objects surrounding the mobile unit at the surrounding object detection apparatus;
a surrounding communication impediment detection step of detecting a likelihood of an impediment to communication in the surroundings of the mobile unit from conditions for surrounding objects detected by the surrounding object detection step;
a relay communication step of transmitting information received by the wireless transceiver from the wireless transceiver; and
a relay wait time setting step of setting a time until information received by the wireless transceiver is transmitted from the wireless transceiver longer in the relay communication step for a larger likelihood of an impediment to communication detected by the surrounding communication impediment detection step.

* * * * *